US012669702B2

(12) United States Patent
Iwamoto

(10) Patent No.: US 12,669,702 B2
(45) Date of Patent: Jun. 30, 2026

(54) OPTICAL SYSTEM AND IMAGE PICKUP APPARATUS

(71) Applicant: CANON KABUSHIKI KAISHA, Tokyo (JP)

(72) Inventor: Shunji Iwamoto, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 413 days.

(21) Appl. No.: 18/166,510

(22) Filed: Feb. 9, 2023

(65) Prior Publication Data

US 2023/0266583 A1 Aug. 24, 2023

(30) Foreign Application Priority Data

Feb. 18, 2022 (JP) ................................. 2022-024113

(51) Int. Cl.
| *G02B 27/00* | (2006.01) |
| *G02B 9/60* | (2006.01) |
| *H04N 23/50* | (2023.01) |

(52) U.S. Cl.
CPC ........... *G02B 27/0025* (2013.01); *G02B 9/60* (2013.01); *H04N 23/50* (2023.01)

(58) Field of Classification Search
CPC .............. G02B 27/0025; G02B 15/177; G02B 15/1461; G02B 9/60; G02B 27/0955
USPC ......................................................... 359/763
See application file for complete search history.

(56) References Cited

U.S. PATENT DOCUMENTS

| 9,217,851 | B2 | 12/2015 | Iwamoto |
| 10,078,202 | B2 | 9/2018 | Iwamoto |
| 10,416,421 | B2 | 9/2019 | Iwamoto |
| 10,663,703 | B2 | 5/2020 | Iwamoto |
| 10,754,169 | B2 | 8/2020 | Iwamoto |
| 11,131,829 | B2 | 9/2021 | Iwamoto |
| 11,181,717 | B2 | 11/2021 | Iwamoto |
| 11,971,607 | B2 * | 4/2024 | Hatada ..................... G02B 9/12 |

(Continued)

FOREIGN PATENT DOCUMENTS

| CN | 101344635 A | 1/2009 |
| JP | 2015-200845 A | 11/2015 |

(Continued)

OTHER PUBLICATIONS

Notice of Reasons for Refusal issued by the Japanese Patent Office on Dec. 16, 2025 in corresponding JP Patent Application No. 2022-024113, with English translation.

(Continued)

*Primary Examiner* — Daniel St Cyr
(74) *Attorney, Agent, or Firm* — Carter, DeLuca & Farrell LLP

(57) ABSTRACT

An optical system includes a plurality of lens units. The lens units consisting of, in order from an object side to an image side, a first lens unit, a second lens unit having positive refractive power, a third lens unit, a fourth lens unit having positive refractive power, and a fifth lens unit. During focusing, the first lens unit, the third lens unit, and the fifth lens unit are fixed, and the second lens unit and the fourth lens unit move. The second lens unit consists of one lens component. The third lens unit includes at least one positive lens and one negative lens. The fourth lens unit includes at least two positive lenses and one negative lens.

24 Claims, 7 Drawing Sheets

(56) References Cited

U.S. PATENT DOCUMENTS

| | | | | | |
|---|---|---|---|---|---|
| 2013/0107089 A1* | 5/2013 | Hatada | ................... | G02B 15/17 359/557 |
| 2014/0055659 A1 | 2/2014 | Iwamoto | | |
| 2015/0316756 A1* | 11/2015 | Sanjo | ............ | G02B 15/145113 359/683 |
| 2016/0178877 A1* | 6/2016 | Inoue | ............ | G02B 15/145519 359/557 |
| 2016/0209631 A1* | 7/2016 | Kimura | ............. | G02B 27/0025 |
| 2016/0252712 A1* | 9/2016 | Uchida | ............. | G02B 15/1461 359/557 |
| 2017/0108678 A1* | 4/2017 | Miyazawa | ............ | G02B 15/20 |
| 2019/0018221 A1* | 1/2019 | Yamazoe | ................ | G02B 9/60 |
| 2021/0382283 A1* | 12/2021 | Komiyama | ........ | G02B 15/1461 |
| 2022/0043243 A1 | 2/2022 | Iwamoto | | |
| 2023/0010047 A1 | 1/2023 | Iwamoto | | |

FOREIGN PATENT DOCUMENTS

| | | | |
|---|---|---|---|
| JP | 2018-180447 A | 11/2018 | |
| JP | 2019120821 A | 7/2019 | |
| JP | 2019-197125 A | 11/2019 | |
| WO | 2018/139160 A1 | 8/2018 | |

OTHER PUBLICATIONS

Chinese Office Action issued by the China National Intellectual Property Administration on Apr. 13, 2026 in corresponding CN Patent Application No. 202310111189.0, with English translation.

* cited by examiner

Fno= 1.63          ω= 24°          ω= 24°          ω= 24°

ΔS    ΔM g    d          d          g

-0.400    0.400   -0.400    0.400   -5.000    5.000   -0.050    0.050

SPHERICAL          ASTIGMATISM    DISTORTION (%)    CHROMATIC
ABERRATION                                          ABERRATION

L0
L1    L2    L3    L4    L5    IMG
SP

OPTICAL SYSTEM AND IMAGE PICKUP APPARATUS

BACKGROUND

Technical Field

One of the aspects of the disclosure relates to an optical system suitable for an image pickup apparatus such as a digital still camera, a video camera, and a surveillance camera.

Description of the Related Art

An image pickup apparatus using a solid-state image sensor such as a CCD sensor or a CMOS sensor requires an optical system to have a wide angle of view, a large aperture ratio, a small size, and high optical performance. The optical system is also demanded to provide high-speed autofocus (AF). Japanese Patent Laid-Open Nos. 2019-197125 and 2015-200845 disclose inner focus type optical systems that drive a focus lens unit in each optical system during focusing.

An optical system with a wide angle of view and a large aperture ratio has difficulty in correcting various aberrations. In particular, in a case where the focus lens unit is made lightweight for high-speed AF, it becomes difficult to suppress aberrational fluctuations during focusing from an object at infinity (infinity object) to a short-distance object.

SUMMARY

One of the aspects of the disclosure provides an optical system and an image pickup apparatus having the same, each of which has a small size, a wide angle of view, and a large aperture ratio, and can provide high-speed focusing.

An optical system according to one aspect of the disclosure includes a plurality of lens units. The lens units consist of, in order from an object side to an image side, a first lens unit, a second lens unit having positive refractive power, a third lens unit, a fourth lens unit having positive refractive power, and a fifth lens unit. During focusing, the first lens unit, the third lens unit, and the fifth lens unit are fixed, and the second lens unit and the fourth lens unit move. The second lens unit consists of one lens component. The third lens unit includes at least one positive lens and one negative lens. The fourth lens unit includes at least two positive lenses and one negative lens. An image pickup apparatus having the above optical system also constitutes another aspect of the disclosure.

Further features of the disclosure will become apparent from the following description of embodiments with reference to the attached drawings.

DESCRIPTION OF THE EMBODIMENTS

Figure 1:
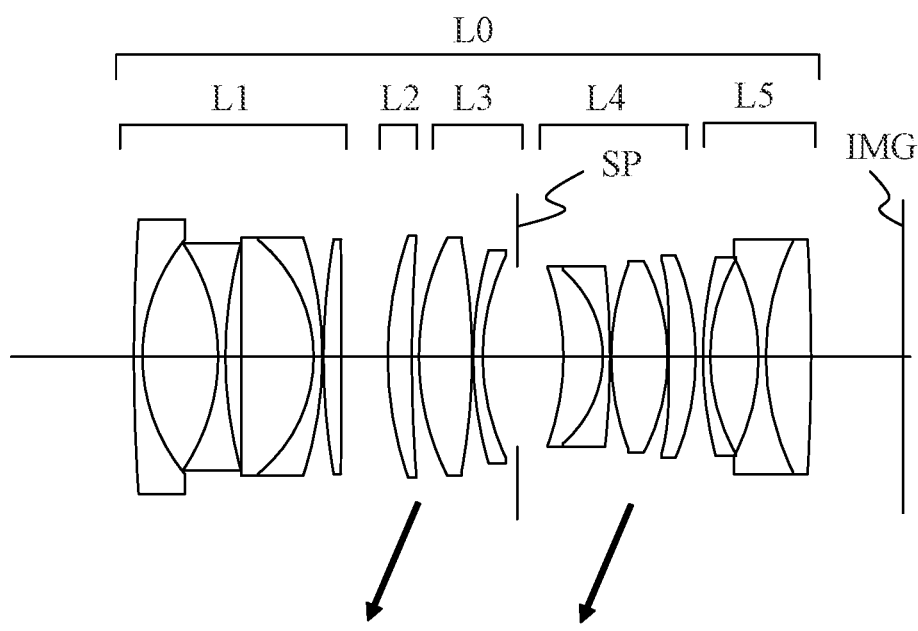
FIG. 1 is a sectional view illustrating a configuration of an optical system according to Example 1.
Figure 2:
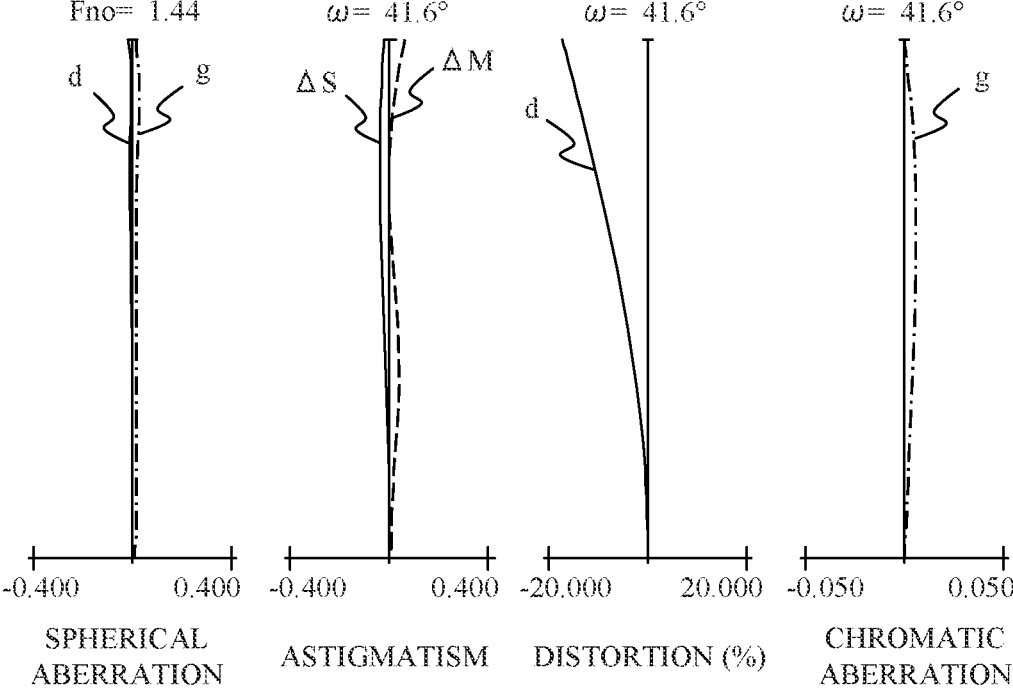
FIG. 2 is a longitudinal aberration diagram of the optical system according to Example 1 in an in-focus state on the infinity object.
Figure 3:
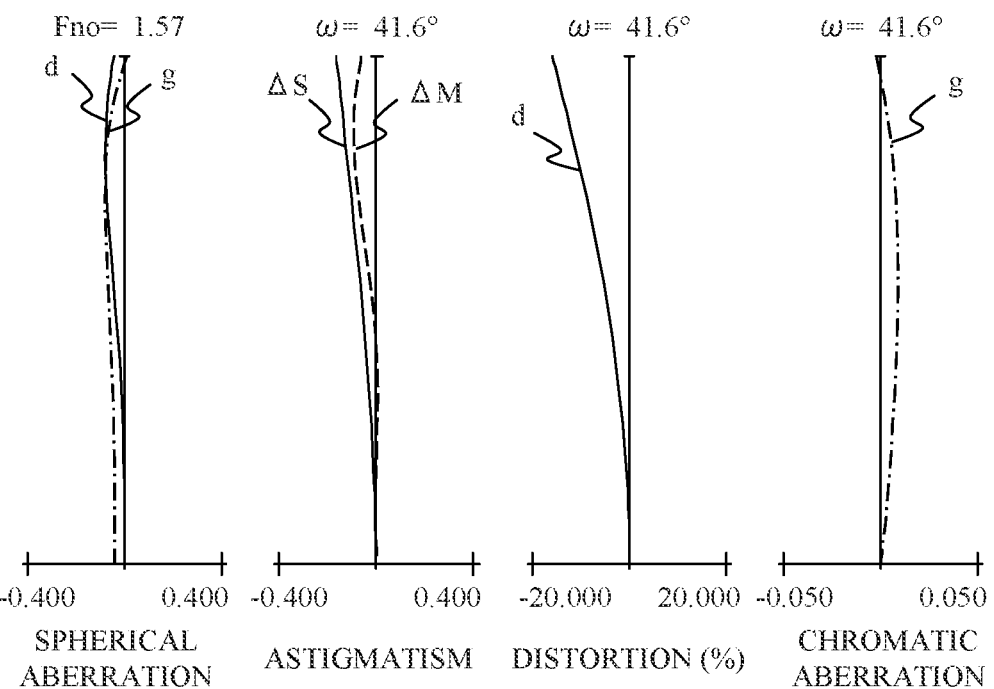
FIG. 3 is a longitudinal aberration diagram of an optical system according to Example 1 in the in-focus state on the closest object.
Figure 4:
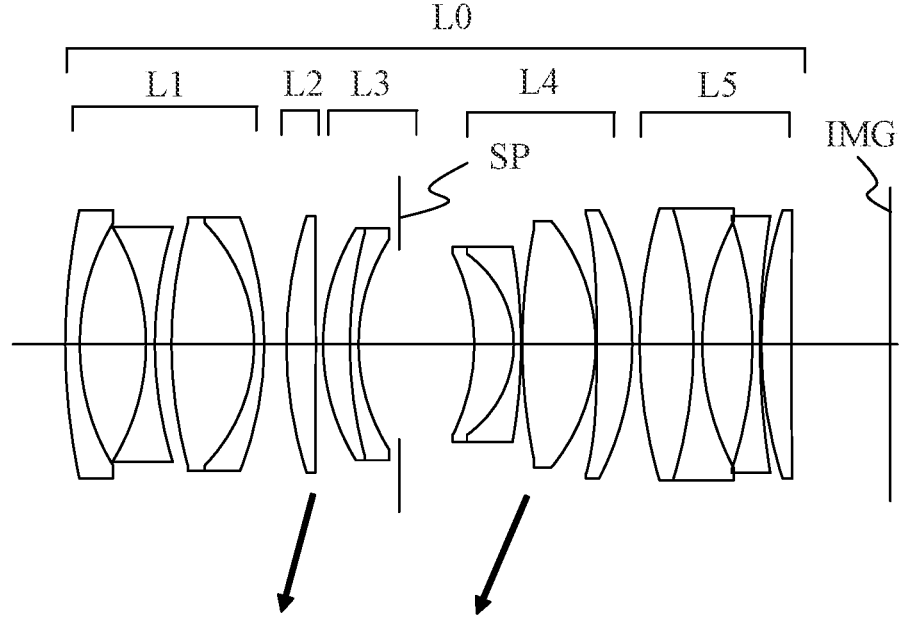
FIG. 4 is a sectional view illustrating a configuration of an optical system according to Example 2.
Figure 5:
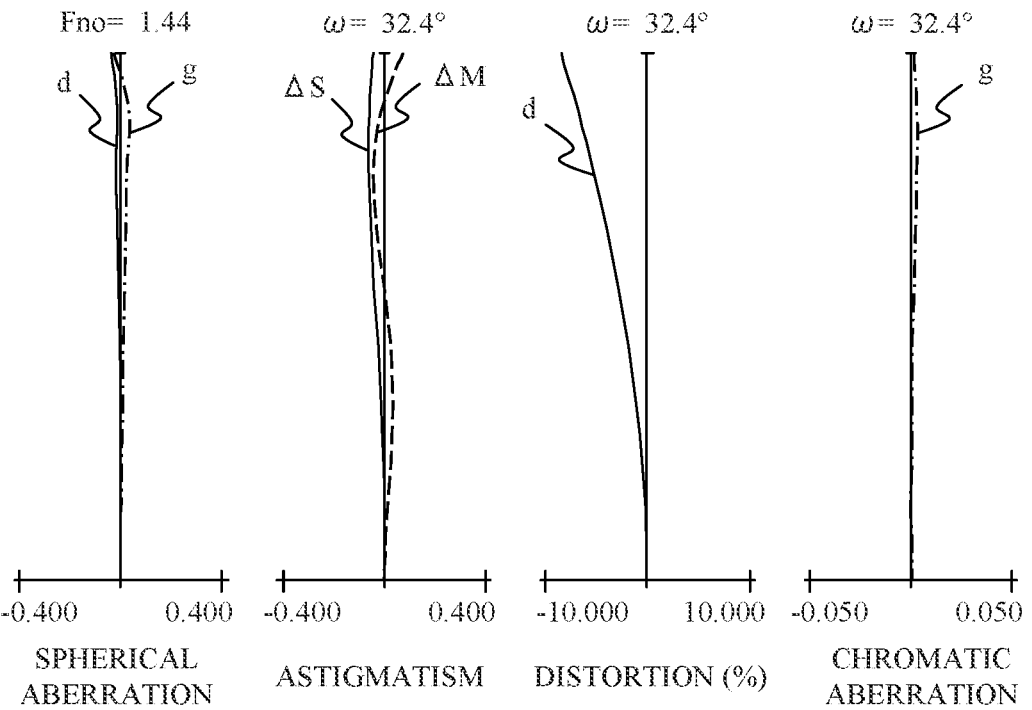
FIG. 5 is a longitudinal aberration diagram of the optical system according to Example 2 in an in-focus state on the infinity object.
Figure 6:
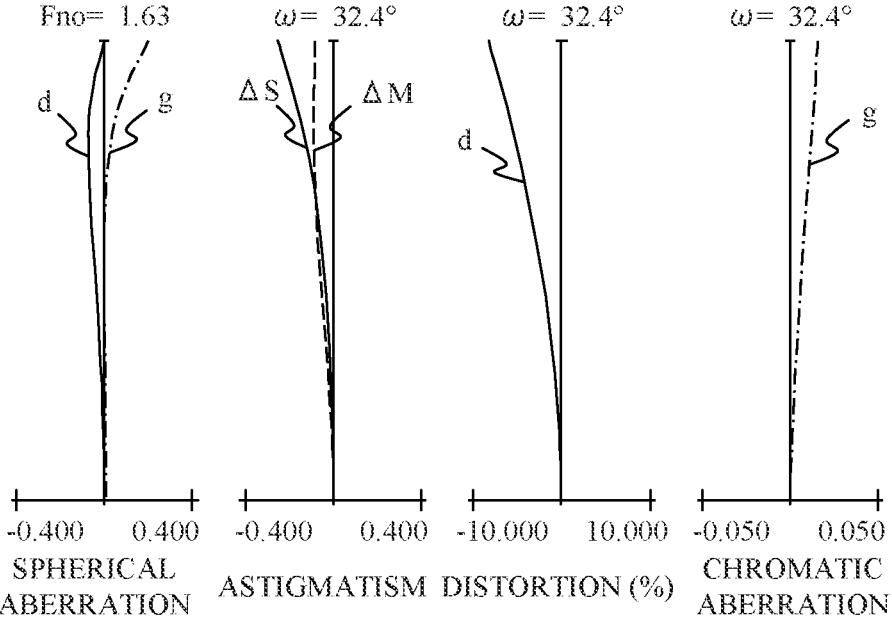
FIG. 6 is a longitudinal aberration diagram of the optical system according to Example 2 in the in-focus state on the closest object.
Figure 7:
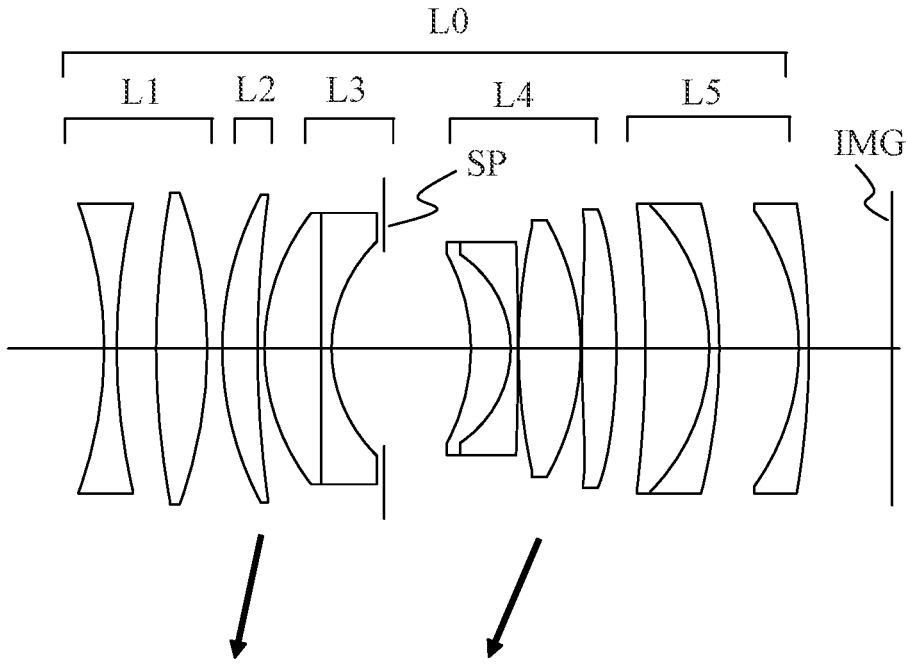
FIG. 7 is a sectional view illustrating a configuration of an optical system according to Example 3.
Figure 8:
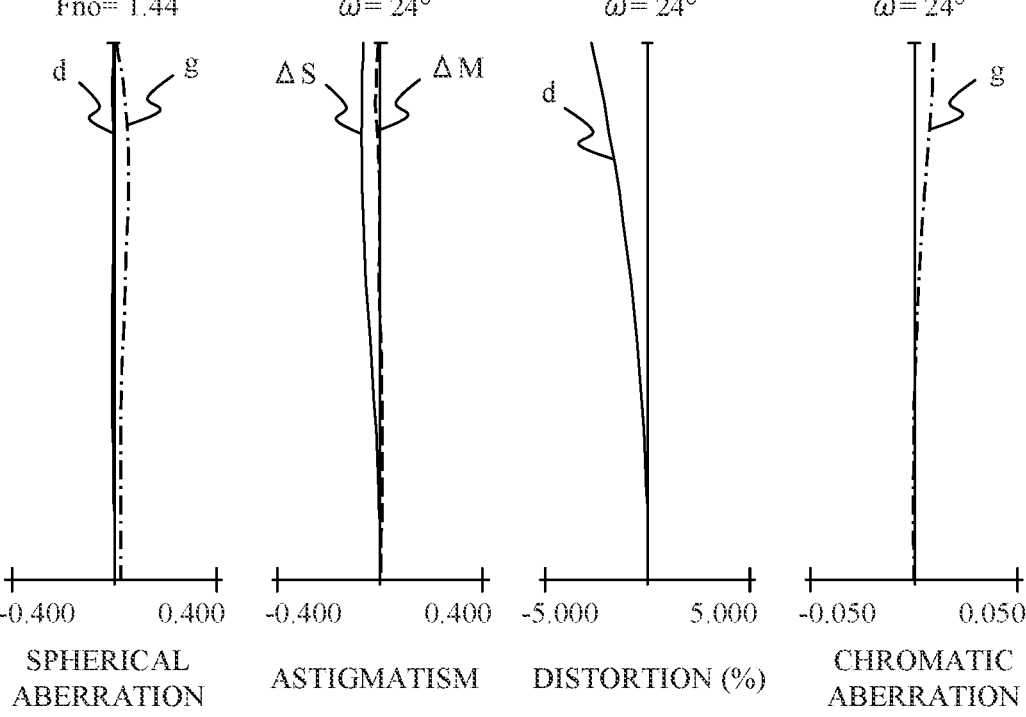
FIG. 8 is a longitudinal aberration diagram of the optical system according to Example 3 in an in-focus state on the infinity object.
Figures 9, 10:
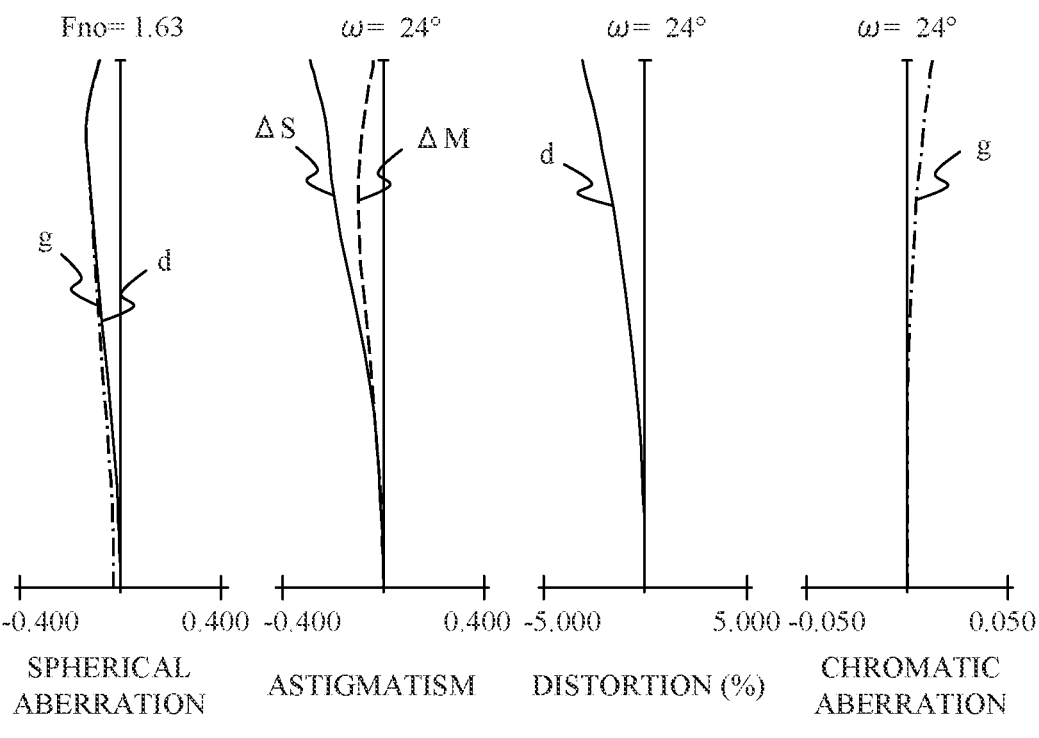
FIG. 9 is a longitudinal aberration diagram of the optical system according to Example 3 in the in-focus state on the closest object.
FIG. 10 is a sectional view illustrating a configuration of an optical system according to Example 4.
Figure 11:
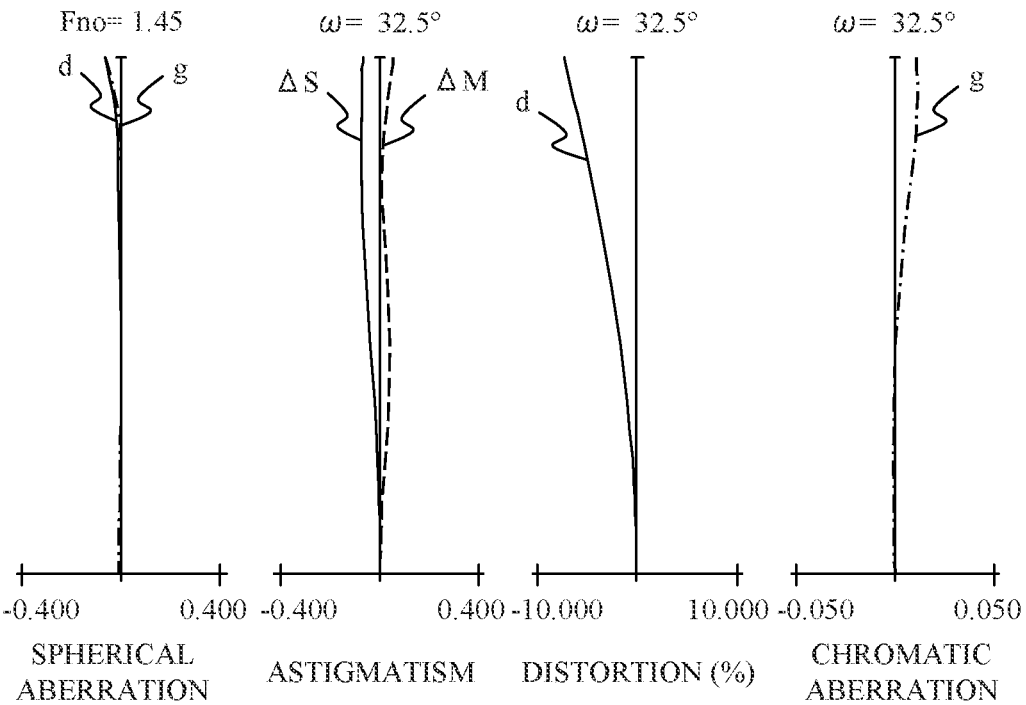
FIG. 11 is a longitudinal aberration diagram of the optical system according to Example 4 in an in-focus state on the infinity object.
Figure 12:
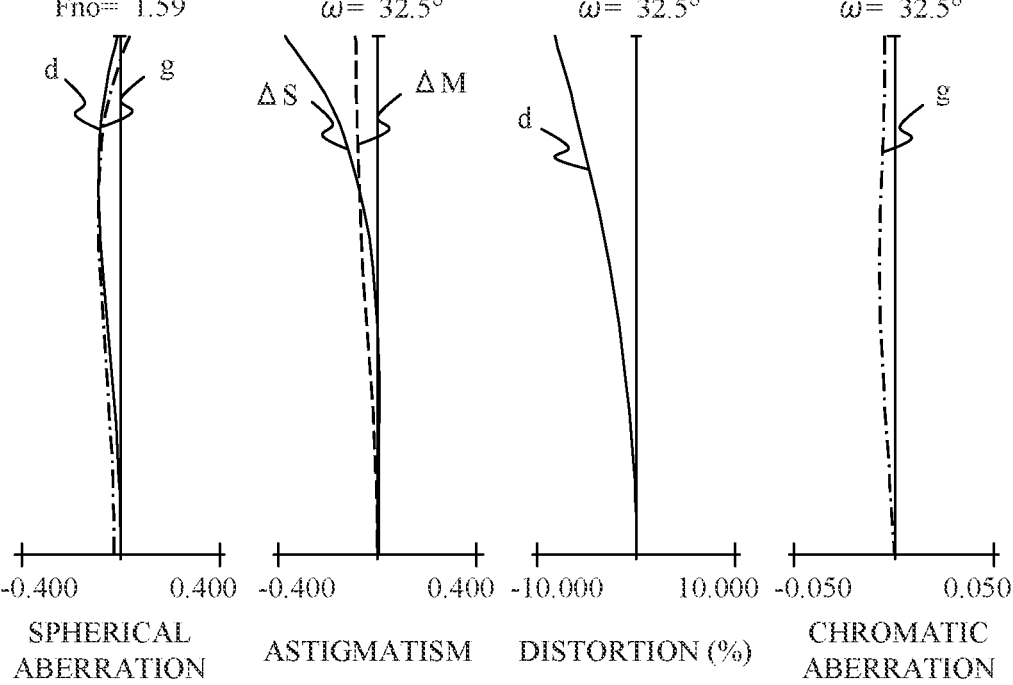
FIG. 12 is a longitudinal aberration diagram of the optical system according to Example 4 in the in-focus state on the closest object.

Referring now to the accompanying drawings, a description will be given of embodiments according to the disclosure.

FIGS. 1, 4, 7, and 11 respectively illustrate sections of optical systems according to Examples 1, 2, 3, and 4 of the disclosure in an in-focus state on the infinity object. In each figure, a left side is an object side and a right side is an image side. The optical system according to each example is used as an imaging optical system in image pickup apparatus such as a video camera, a digital still camera, a broadcasting camera, a film-based camera, and a surveillance camera. The imaging lens may be interchangeable or integrated with the image pickup apparatus.

The optical system L0 according to each example includes a plurality of lens units (L1 to L5). The lens unit is a group of one or more lenses that move together during focusing or zooming. That is, a distance between adjacent lens units changes during focusing and zooming. The lens unit may include an aperture stop (diaphragm). In each figure, SP denotes an aperture stop and IMG denotes an image plane. The imaging plane of a solid-state image sensor (photoelectric conversion element) such as a CCD sensor or CMOS sensor or the film plane (photosensitive plane) of a silver film is on the image plane IMG.

The optical system L0 according to each example includes a plurality of lens units. The lens units consist of, in order from the object side to the image side, a first lens unit L1 having positive or negative refractive power, a second lens unit L2 having positive refractive power, a third lens unit L3 having positive or negative refractive power, a fourth lens unit L4 having positive refractive power, and a fifth lens unit L5 having positive or negative refractive power. In the optical system L0 according to each example, the first lens unit L1, the third lens unit L3 and the fifth lens unit L5 are fixed (immovable) relative to the image plane IMG during focusing, and the second lens unit L2 and the fourth lens unit L4 move. Arrows illustrated below the second lens unit L2 and the fourth lens unit L4 in each figure indicate their moving directions during focusing from the infinity object to the closest object.

In order to achieve high-speed AF in an optical system that has a compact size, high performance, a wide angle of view, and a large aperture ratio, it is important to properly set the arrangement of the lens units in the optical system and the configuration and arrangement of the focus lens unit. The optical system according to each example corrects aberrations and makes lightweight the focus lens unit by moving some (L2 and L4) of the plurality of lens units (L1 to L5) in this optical system. By dispersing the positive power to both of the two focus lens units (L2 and L4) as positive lens units, fluctuations of aberrations, especially astigmatism, coma, and lateral chromatic aberration, can be suppressed during focusing.

In the optical system according to each example, the second lens unit L2 consists of one lens component. The third lens unit L3 includes at least one positive lens and one negative lens. The fourth lens unit L4 includes at least two positive lenses and one negative lens. Since the second lens unit L2, which moves during focusing, includes a single positive lens, high-speed AF can be facilitated. Here, the one lens component consists of a single lens, or one cemented lens in which a plurality of lenses are cemented. Since the third lens unit L3, which is fixed during focusing, includes a positive lens and a negative lens, it becomes easy to correct longitudinal chromatic aberration and spherical aberration while an increase in the weight of the focus lens unit is suppressed. Since the fourth lens unit L4 includes at least two positive lenses and one negative lens, it becomes easy to suppress fluctuations of aberrations, particularly variations in longitudinal chromatic aberration and spherical aberration, during focusing.

A description will now be given of the configuration that the optical system according to each example may satisfy.

The fifth lens unit L5 may include one positive lens and two negative lenses. Since the fifth lens unit L5 is a lens unit disposed closest to the image plane in the optical system, this configuration is effective in correcting the Petzval sum. Since the fifth lens unit L5 includes one positive lens and two negative lenses, correction of the curvature of field becomes facilitated.

The fourth lens unit L4 may include, in order from the object side to the image side, a cemented lens, a biconvex positive lens, and a positive lens. The cemented lens disposed on the object side where it is relatively easy to reduce the lens diameter can easily correct longitudinal chromatic aberration while an increase in the weight of the focus lens unit is suppressed. In addition, since the fourth lens unit L4 includes two positive lenses and the positive lens on the object side is the biconvex lens, the positive power is dispersed to facilitate aberration correction and suppressing the moving amount of the focus lens unit can facilitate high-speed AF. In a case where the number of lenses of the fourth lens unit L4 is too large, it becomes difficult to reduce the weight of the focus lens unit.

An aperture stop SP may be provided in the third lens unit L3. The aperture stop SP in the third lens unit L3 near the center of the entire optical system improves the symmetry of the optical system before and after the aperture stop SP, and facilitates corrections of coma and distortion.

The third lens unit L3 may include, in order from the object side to the image side, a positive lens and a negative lens. The positive lens disposed on the object side can converge an on-axis light flux, easily suppress the lens diameter of the fourth lens unit L4 disposed on the image side of the third lens unit L3, and consequently easily reduce the weight of the fourth lens unit L4 as the focus lens unit.

In a case where the third lens unit L3 includes three or more lenses, the third lens unit L3 and, in turn, the optical system becomes large.

The first lens unit L1 may include a negative lens disposed closest to the object. The retrofocus type power arrangement in which the negative lens is disposed closest to the object can easily widen the angle of view.

The second lens unit L2 and the fourth lens unit L4 may move by different moving amounts during focusing. This configuration facilitates aberration correction in the in-focus state on the closest object.

A description will be given of one or more inequalities that the optical system according to each example may satisfy. The optical system according to each example may satisfy at least one of the following inequalities (1) to (18):

$$0.05 \leq M4/f \leq 0.40 \tag{1}$$

$$0.01 \leq M2/f \leq 0.45 \tag{2}$$

$$-0.3 \leq f/f1 \leq 0.2 \tag{3}$$

$$0.05 \leq f/f2 \leq 1.10 \tag{4}$$

$$-1.0 \leq f/f3 \leq 0.5 \tag{5}$$

$$0.5 \leq f/f4 \leq 1.5 \tag{6}$$

$$-1.00 \leq f/f5 \leq -0.01 \tag{7}$$

$$-0.99 \leq b2 \leq 0.20 \tag{8}$$

$$0.3 \leq b4 \leq 0.8 \tag{9}$$

$$0.1 \leq T1/f \leq 1.5 \tag{10}$$

$$0.01 \leq T2/f \leq 0.40 \tag{11}$$

$$0.01 \leq T3/f \leq 0.50 \tag{12}$$

$$0.1 \leq T4/f \leq 1.0 \tag{13}$$

$$0.15 \leq T5/f \leq 0.90 \tag{14}$$

$$0.05 \leq sk/f \leq 1.00 \tag{15}$$

$$1 \leq TD/f \leq 6 \tag{16}$$

$$-2.0 \leq f/f11 \leq -0.1 \tag{17}$$

$$0.2 \leq (r2b+r2a)/(r2b-r2a) \leq 4.0 \tag{18}$$

In inequalities (1) to (18), M4 denotes an absolute value of the moving amount of the fourth lens unit L4 during focusing from the infinity object to the closest object. Regarding a certain target lens surface of the fourth lens unit L4, the moving amount of the fourth lens unit L4 here is a difference between the position of the target lens surface in the in-focus state on the infinity object and the position of the target lens surface in the in-focus state on the closest object. The sign of the moving amount is positive in a case where the fourth lens unit is located on the object side and negative in a case where the fourth lens unit is located on the image side in the in-focus state on the closest object in comparison with the in-focus state on the infinity object. An absolute value of the moving amount of another lens unit is similarly defined. The closest object is an object located at the shortest distance (closest distance) among imagable distances with the optical system according to each example.

f is a focal length of the entire optical system in the in-focus state on the infinity object. M2 denotes an absolute value of a moving amount of the second lens unit L2 during focusing from the infinity object to the closest object. f1 is a focal length of the first lens unit L1, f2 is a focal length of the second lens unit L2, f3 is a focal length of the third lens unit L3, f4 is a focal length of the fourth lens unit L4, and f5 is a focal length of the fifth lens unit L5.

b2 is a lateral magnification in the in-focus state on the infinity object of the second lens unit L2, and b4 is a lateral magnification in the in-focus state on the infinity object of the fourth lens unit L4. T1 is a distance on the optical axis from a lens surface closest to the object of the first lens unit L1 to a lens surface closest to the image plane of the first lens unit L1. T2 is a distance on the optical axis from a lens surface closest to the object of the second lens unit L2 to a lens surface closest to the image plane of the second lens unit L2. T3 is a distance on the optical axis from a lens surface closest to the object of the third lens unit L3 to a lens surface closest to the image plane of the third lens unit L3. T4 is a distance on the optical axis from a lens surface closest to the object of the fourth lens unit L4 to a lens surface closest to the image plane of the fourth lens unit L4. T5 is a distance on the optical axis from a lens surface closest to the object of the fifth lens unit L5 to a lens surface closest to the image plane of the fifth lens unit L5.

sk is a distance (back focus) on the optical axis from a lens surface on the image side of the lens closest to the image plane in the optical system (lenses having refractive powers) to the image plane. TD is a distance (overall lens length) on the optical axis from a lens surface on the object side of the lens closest to the object in the optical system (lenses having refractive powers) to the image plane. f11 is a focal length of a lens closest to the object in the optical system (lenses having refractive powers). r2a is a radius of curvature of a lens surface closest to the object of the second lens unit L2, and r2b is a radius of curvature of a lens surface closest to the image plane of the second lens unit L2.

Inequality (1) defines a condition of the moving amount of the fourth lens unit L4 during focusing. In a case where the moving amount is so large that M4/f is higher than the upper limit of inequality (1), high-speed AF becomes difficult to realize. In a case where the moving amount is so small that M4/f is lower than the lower limit of inequality (1), it becomes difficult to correct fluctuations in aberrations, especially astigmatism, during focusing.

Inequality (2) defines a condition of the moving amount of the second lens unit L2 during focusing. In a case where the moving amount is so large that M2/f is higher than the upper limit of inequality (2), the optical system becomes large. In a case where the moving amount becomes so small that the moving amount is lower than the lower limit, it becomes difficult to correct fluctuations of aberrations, particularly spherical aberration, during focusing.

Inequality (3) defines a condition of the focal length of the first lens unit L1. In a case where the focal length of the first lens unit L1 is short (the refractive power is large) so that f/f1 is higher than the upper limit of inequality (3), a telephoto type power arrangement is formed and it becomes difficult to secure the back focus. In a case where the focal length of the first lens unit L1 is long (the refractive power is small) so that f/f1 is lower than the lower limit of inequality (3), the overall length of the optical system becomes long and it becomes difficult to make small the system.

Inequality (4) defines a condition of the focal length of the second lens unit L2. In a case where the focal length of the second lens unit L2 becomes so short that f/f2 is higher than the upper limit of inequality (4), the weight of the second lens unit L2 increases and high-speed AF becomes difficult to realize. In a case where the focal length of the second lens unit L2 becomes so long that f/f2 is lower than the lower limit of inequality (4), it becomes difficult to correct fluctuations in aberrations, especially astigmatism, during focusing.

Inequality (5) defines a condition of the focal length of the third lens unit L3. In a case where the focal length of the third lens unit L3 is so short that f/f3 is higher than the upper limit of the inequality (5), it becomes difficult to correct aberrations generated by the third lens unit L3, especially spherical aberration and longitudinal chromatic aberration. In a case where the focal length of the third lens unit L3 is so long that f/f3 is lower than the lower limit of inequality (5), it becomes difficult to reduce the lens diameter of the fourth lens unit L4 and high-speed AF becomes difficult to realize.

Inequality (6) defines a condition of the focal length of the fourth lens unit L4. In a case where the focal length of the fourth lens unit L4 is so short that f/f4 is higher than the upper limit of inequality (6), the weight of the second lens unit L2 that moves together during focusing increases, and high-speed AF becomes difficult to realize. In a case where the focal length of the fourth lens unit L4 is so long that f/f4 is lower than the lower limit of inequality (6), it becomes difficult to correct variations in aberrations, especially spherical aberration and longitudinal chromatic aberration, during focusing.

Inequality (7) defines a condition of the focal length of the fifth lens unit L5. In a case where the focal length of the fifth lens unit L5 is so short that f/f5 is higher than the upper limit of the inequality (7), it becomes difficult to correct the Petzval sum and suppress the curvature of field. In a case where the focal length of the fifth lens unit L5 is so long that f/f5 is lower than the lower limit of inequality (7), it becomes difficult to secure the back focus.

Inequality (8) defines a condition of the lateral magnification of the second lens unit L2 in the in-focus state on the infinity object. In a case where b2 is higher than the upper limit of inequality (8), a height of an on-axis ray during focusing significantly changes, and particularly spherical aberration significantly changes. In a case where b2 is lower than the lower limit of inequality (8), the lens diameter of the second lens unit L2 increases, and it becomes difficult to reduce the weight of the second lens unit L2 as the focus lens unit.

Inequality (9) defines a condition of the lateral magnification of the fourth lens unit L4 in the in-focus state on the infinity object. In a case where b4 is higher than the upper limit of inequality (9), a height of an on-axis ray during focusing significantly changes, and particularly spherical aberration significantly changes. In a case where b4 is lower than the lower limit of inequality (9), the lens diameter of the fourth lens unit L4 increases, and it becomes difficult to reduce the weight of the fourth lens unit L4 as the focus lens unit.

Inequality (10) defines a condition of the thickness of the first lens unit L1 in the optical axis direction. In a case where the thickness of the first lens unit L1 is increased so that T1/f is higher than the upper limit of the inequality (10), the optical system becomes large. In a case where the thickness of the first lens unit L1 is reduced so that T1/f is lower than the lower limit of inequality (10), it becomes difficult to correct aberrations, especially distortion, generated in the first lens unit L1.

Inequality (11) defines a condition of the thickness of the second lens unit L2 in the optical axis direction. In a case where the thickness of the second lens unit L2 is increased so that T2/f is higher than the upper limit of the inequality (11), the optical system becomes large. In a case where the thickness of the second lens unit L2 is reduced so that T2/f is lower than the lower limit of inequality (11), it becomes difficult to correct aberrations, especially distortion, generated by the second lens unit L2.

Inequality (12) defines a condition of the thickness of the third lens unit L3 in the optical axis direction. In a case where the thickness of the third lens unit L3 is so large that T3/f is higher than the upper limit of inequality (12), the optical system becomes large. In a case where the thickness of the third lens unit L3 is so small that T3/f is lower than the lower limit of inequality (12), it becomes difficult to correct aberrations generated by the third lens unit L3, especially longitudinal chromatic aberration and spherical aberration.

Inequality (13) defines a condition of the thickness of the fourth lens unit L4 in the optical axis direction. In a case where the thickness of the fourth lens unit L4 is so large that T4/f is higher than the upper limit of inequality (13), the weight of the fourth lens unit L4 increases, and high-speed AF becomes difficult to realize. In a case where the thickness of the fourth lens unit L4 is so small that T4/f is lower than the lower limit of inequality (12), it becomes difficult to correct aberrations, especially spherical aberration and astigmatism, generated by the fourth lens unit L4.

Inequality (14) defines a condition of the thickness of the fifth lens unit L5 in the optical axis direction. In a case where the thickness of the fifth lens unit L5 is so large that T5/f is higher than the upper limit of inequality (14), the optical system becomes large. In a case where the thickness of the fifth lens unit L5 is so small that T5/f is lower than the lower limit of inequality (14), correction of curvature of field and distortion becomes difficult.

Inequality (15) defines a condition of the back focus. In a case where the back focus is so large that sk/f is higher than the upper limit of inequality (15), the optical system becomes large. In a case where the back focus is so small that sk/f is lower than the lower limit of inequality (15), it becomes difficult to lay out optical blocks such as an image sensor and a low-pass filter near the image plane.

Inequality (16) defines a condition of the overall lens length. In a case where the overall lens length is so long that TD/f is higher than the upper limit of inequality (16), the lens diameters of the first lens unit L1 and the second lens unit L2 increase, and it becomes difficult to make small the optical system. In a case where the overall lens length is so short that TD/f is lower than the lower limit of inequality (16), the refractive power of each lens unit increases, and it becomes difficult to correct coma and curvature of field.

Inequality (17) defines a condition of the focal length of the lens disposed closest to the object in the optical system (first lens unit L1). In a case where f/f11 is higher than the upper limit of inequality (17), it becomes difficult to widen the angle of view of the optical system. In a case where f/f11 is lower than the lower limit of inequality (17), it becomes difficult to correct distortion.

Inequality (18) defines a condition of the shape of the second lens unit L2. If (r2b+r2a)/(r2b−r2a) is higher than the upper limit of inequality (18), the focus variation of spherical aberration increases. If (r2b+r2a)/(r2b−r2a) is lower than the lower limit of inequality (18), it becomes difficult to correct focus variations of astigmatism.

Satisfying at least one of the above inequalities can easily provide an optical system that has a small size, a wide angle of view, and a large aperture ratio and can provide high-speed AF.

Inequalities (1) to (18) may be replaced with the following inequalities (1a) to (18a):

$$0.08 \leq M4/f \leq 0.30 \tag{1a}$$

$$0.015 \leq M2/f \leq 0.350 \tag{2a}$$

$$-0.25 \leq f/f1 \leq 0.15 \tag{3a}$$

$$0.1 \leq f/f2 \leq 0.9 \tag{4a}$$

$$-0.8 \leq f/f3 \leq 0.4 \tag{5a}$$

$$0.6 \leq f/f4 \leq 1.3 \tag{6a}$$

$$-0.80 \leq f/f5 \leq -0.06 \tag{7a}$$

$$-0.9 \leq b2 \leq 0.1 \tag{8a}$$

$$0.4 \leq b4 \leq 0.7 \tag{9a}$$

$$0.2 \leq T1/f \leq 1.4 \tag{10a}$$

$$0.05 \leq T2/f \leq 0.30 \tag{11a}$$

$$0.06 \leq T3/f \leq 0.42 \tag{12a}$$

$$0.2 \leq T4/f \leq 0.9 \tag{13a}$$

$$0.25 \leq T5/f \leq 0.80 \tag{14a}$$

$$0.1 \leq sk/f \leq 0.7 \tag{15a}$$

$$1.5 \leq TD/f \leq 5.0 \tag{16a}$$

$$-1.6 \leq f/f11 \leq -0.2 \tag{17a}$$

$$0.4 \leq (r2b+r2a)/(r2b-r2a) \leq 3.0 \tag{18a}$$

Inequalities (1) to (18) may be replaced with the following inequalities (1b) to (18b):

$$0.09 \leq M4/f \leq 0.20 \tag{1b}$$

$$0.02 \leq M2/f \leq 0.25 \tag{2b}$$

$$-0.20 \leq f/f1 \leq 0.09 \tag{3b}$$

$$0.15 \leq f/f2 \leq 0.80 \tag{4b}$$

$$-0.7 \leq f/f3 \leq 0.3 \tag{5b}$$

$$0.70 \leq f/f4 \leq 1.15 \tag{6b}$$

$$-0.600 \leq f/f5 \leq -0.115 \tag{7b}$$

$$-0.87 \leq b2 \leq 0.08 \tag{8b}$$

$$0.44 \leq b4 \leq 0.60 \tag{9b}$$

$$0.25 \leq T1/f \leq 1.30 \tag{10b}$$

$$0.08 \leq T2/f \leq 0.20 \tag{11b}$$

$$0.12 \leq T3/f \leq 0.38 \tag{12b}$$

$$0.3 \leq T4/f \leq 0.8 \tag{13b}$$

$$0.35 \leq T5/f \leq 0.70 \tag{14b}$$

$$0.2 \leq sk/f \leq 0.6 \tag{15b}$$

$$1.8 \leq TD/f \leq 4.0 \tag{16b}$$

$$-1.3 \leq f/f11 \leq -0.3 \tag{17b}$$

$$0.5 \leq (r2b+r2a)/(r2b-r2a) \leq 2.5 \tag{18b}$$

A specific description will now be given of the optical systems according to Examples 1 to 4. As described above, the optical system according to each example includes a plurality of lens units. The lens units consist of, in order from the object side to the image side, the first lens unit L1, the second lens unit L2 having positive refractive power, the third lens unit L3, the fourth lens unit L4 having positive refractive power, and the fifth lens unit L5. During focusing from the infinity object to the closest object, the second lens unit L2 and fourth lens unit L4 move, and the first lens unit L1, third lens unit L3, and the fifth lens unit L5 are fixed. The second lens unit L2 consists of one lens component. The third lens unit L3 includes at least one positive lens and one negative lens. The fourth lens unit L4 includes at least two positive lenses and one negative lens. The aperture stop SP is disposed in the third lens unit L3.

Numerical examples 1 to 4 below illustrate examples of numerical values of the optical systems according to Examples 1 to 4, respectively. In each numerical example, a surface number i indicates an order of an optical surface counted from the object, and r (mm) indicates a radius of curvature of the optical surface. d (mm) indicates an interval (distance) on the optical axis between an i-th surface and an (i+1)-th surface. nd is a refractive index for the d-line of an optical element between the i-th surface and the (i+1)-th surface. vd is an Abbe number based on the d-line of the optical element between the i-th surface and the (i+1)-th surface. The Abbe number vd is expressed as follows:

$$vd=(Nd-1)/(NF-NC)$$

where Nd, NF, and NC are refractive indexes of the optical element based on the d-line (587.6 nm), F-line (486.1 nm), and C-line (656.3 nm) in the Fraunhofer line, respectively.

In each numerical example, a value of each of the distance d, focal length, F-number, and half angle of view(° is determined in a case where the optical system is in the in-focus state on the infinity object. sk denotes the back focus (mm). The back focus is a distance on the optical axis from the final surface (lens surface closest to the image plane) of the optical system to the paraxial image surface in terms of an air conversion length. The overall lens length is a length obtained by adding the back focus to a distance on the optical axis from the front surface (the lens surface closest to the object) to the final surface of the optical system.

An asterisk * attached to the right side of the surface number means that the optical surface is aspheric. The aspherical shape is expressed as follows:

$$x=(h^2/R)/[1+\{1-(1+k)(h/R)^2\}^{1/2}]+A4\times h^4+A6\times h^6+A8\times h^8+A10\times h^{10}+A12\times h^{12}$$

where x is a displacement amount from a surface vertex in the optical axis direction, h is a height from the optical axis in a direction orthogonal to the optical axis, R is a paraxial radius of curvature, k is a conical constant, A4, A6, A8, A10, and A12 are aspherical coefficients. "e±XX" in each aspherical coefficient means "×10±XX" in the conical constant and aspherical coefficients.

The lens unit interval in the in-focus state on the infinity object and the lens unit interval in the in-focus state on the closest object are illustrated. An object distance in the in-focus state on the closest object is indicated in parentheses. An object distance is a distance from the image plane to the object position.

Table 1 summarizes the values corresponding to inequalities (1) to (18) in numerical examples 1 to 4.

FIGS. 2, 5, 8, and 12 illustrate longitudinal aberrations (spherical aberration, astigmatism, distortion, and chromatic aberration) in the in-focus state on the closest object of the optical systems according to numerical examples 1 to 4, respectively. In the spherical aberration diagrams, Fno denotes an F-number, a solid line indicates a spherical aberration amount for the d-line (wavelength: 587.6 nm), and a dashed line indicates a spherical aberration amount for the g-line (wavelength: 435.8 nm). In the astigmatism diagram, a solid line ΔS indicates an astigmatism amount on a sagittal image plane, and a dashed line ΔM indicates an astigmatism amount on a meridional image plane. The distortion diagram illustrates a distortion amount for the d-line. The chromatic aberration diagram illustrates a lateral chromatic aberration amount for the g-line. ω is a half angle of view (°).

Numerical Example 1

| UNIT: mm | | | | |
|---|---|---|---|---|
| Surface Data | | | | |
| Surface No. | r | d | nd | vd |
| 1 | 268.127 | 1.20 | 1.61800 | 63.4 |
| 2 | 25.391 | 10.49 | | |
| 3 | −27.729 | 1.00 | 1.49700 | 81.5 |
| 4 | 58.394 | 2.18 | | |
| 5 | 4572.062 | 10.07 | 1.72916 | 54.7 |
| 6 | −20.881 | 1.20 | 1.64769 | 33.8 |
| 7 | −52.141 | 0.15 | | |
| 8 | 93.762 | 2.47 | 2.05090 | 26.9 |
| 9 | −2255.545 | (variable) | | |
| 10 | 50.628 | 3.33 | 1.49700 | 81.5 |
| 11 | 213.010 | (variable) | | |
| 12 | 36.449 | 7.37 | 1.49700 | 81.5 |
| 13 | −86.700 | 0.15 | | |
| 14 | 52.111 | 1.30 | 1.77047 | 29.7 |
| 15 | 31.825 | 4.80 | | |
| 16 (aperture stop) | ∞ | (variable) | | |
| 17 | −35.175 | 5.46 | 1.43875 | 94.7 |
| 18 | −15.761 | 1.00 | 1.72047 | 34.7 |
| 19 | −108.234 | 0.15 | | |
| 20 | 35.518 | 7.83 | 1.49700 | 81.5 |
| 21 | −28.098 | 0.15 | | |
| 22* | −10000.000 | 3.72 | 1.85400 | 40.4 |
| 23* | −39.933 | (variable) | | |
| 24 | 53.749 | 1.00 | 1.72047 | 34.7 |
| 25 | 27.162 | 6.72 | | |
| 26 | −29.555 | 1.00 | 1.59270 | 35.3 |
| 27 | 35.766 | 6.29 | 2.00100 | 29.1 |
| 28 | −255.727 | 12.72 | | |
| Image Plane | ∞ | | | |

| Aspheric Data |
|---|
| 22nd Surface |
| K = 0.00000e+000 A 4 = −2.63160e−005 A 6 = −2.82840e−008 A 8 = −1.20483e−010 A10 = 7.73278e−013 |
| 23rd Surface |
| K = 0.00000e+000 A 4 = −5.94014e−006 A 6 = −2.25330e−008 A 8 = −2.39058e−011 A10 = 5.34837e−013 |

| | |
|---|---|
| Focal Length | 24.36 |
| Fno | 1.44 |
| Half Angle of View(°) | 41.61 |

-continued

| UNIT: mm | |
| --- | --- |
| Image Height | 21.64 |
| Overall Lens Length | 106.56 |
| sk | 12.72 |

| Lens Unit Interval | | |
| --- | --- | --- |
| | Infinity | Closest (−240 mm) |
| d 9 | 6.42 | 1.00 |
| d11 | 1.00 | 6.42 |
| d16 | 6.41 | 3.85 |
| d23 | 1.00 | 3.55 |

| Lens Unit Data | | |
| --- | --- | --- |
| Lens Unit | Starting Surface | Focal Length |
| 1 | 1 | −162.08 |
| 2 | 10 | 132.73 |
| 3 | 12 | 92.59 |
| 4 | 17 | 29.48 |
| 5 | 24 | −57.44 |

Numerical Example 2

| UNIT: mm | | | |
| --- | --- | --- | --- |
| Surface Data | | | |
| Surface No. | r | d | nd | νd |
| 1 | 88.572 | 2.00 | 1.58313 | 59.4 |
| 2* | 34.245 | 9.15 | | |
| 3 | −30.590 | 1.20 | 1.56732 | 42.8 |
| 4 | 53.915 | 2.30 | | |
| 5 | 62.944 | 11.42 | 1.83481 | 42.7 |
| 6 | −23.941 | 1.40 | 1.85478 | 24.8 |
| 7 | −47.250 | (variable) | | |
| 8 | 57.044 | 4.07 | 1.92286 | 20.9 |
| 9 | −2074.345 | (variable) | | |
| 10 | 30.498 | 3.70 | 1.59522 | 67.7 |
| 11 | 58.291 | 1.20 | 1.85478 | 24.8 |
| 12 | 27.083 | 5.61 | | |
| 13 (aperture stop) | ∞ | (variable) | | |
| 14 | −27.657 | 5.45 | 1.43875 | 94.7 |
| 15 | −15.312 | 1.00 | 1.77047 | 29.7 |
| 16 | −76.877 | 0.15 | | |
| 17 | 78.338 | 10.14 | 1.49700 | 81.5 |
| 18 | −26.670 | 0.15 | | |
| 19* | −351.940 | 4.90 | 1.80400 | 46.5 |
| 20 | −39.592 | (variable) | | |
| 21 | 65.421 | 7.46 | 2.00100 | 29.1 |
| 22 | −63.240 | 1.20 | 1.73800 | 32.3 |
| 23 | 35.661 | 6.94 | | |
| 24 | −52.972 | 1.00 | 1.61340 | 44.3 |
| 25 | 110.397 | 0.20 | | |
| 26 | 59.973 | 4.12 | 1.59522 | 67.7 |
| 27 | 1144.661 | 13.67 | | |
| Image Plane | ∞ | | | |

| Aspheric Data |
| --- |
| 2nd Surface |

K = 0.00000e+000 A 4 = 2.12964e−006 A 6 = −1.52028e−009
A 8 = 1.93728e−011

19th Surface

K = 0.00000e+000 A 4 = −8.83374e−006 A 6 = −2.00315e−009
A 8 = −1.99539e−012 A10 = −1.41539e−014

| Focal Length | 34.09 |
| --- | --- |
| Fno | 1.45 |

-continued

| UNIT: mm | |
| --- | --- |
| Half Angle of View(°) | 32.40 |
| Image Height | 21.64 |
| Overall Lens Length | 113.84 |
| sk | 13.67 |

| Lens Unit Interval | | |
| --- | --- | --- |
| | Infinity | Closest (−280 mm) |
| d 7 | 3.03 | 1.00 |
| d 9 | 0.99 | 3.03 |
| d13 | 10.38 | 4.52 |
| d20 | 1.00 | 6.86 |
| d27 | 13.67 | 7.88 |

| Lens Unit Data | | |
| --- | --- | --- |
| Lens Unit | Starting Surface | Focal Length |
| 1 | 1 | −470.22 |
| 2 | 8 | 60.21 |
| 3 | 10 | −170.04 |
| 4 | 14 | 41.65 |
| 5 | 21 | −139.70 |

Numerical Example 3

| UNIT: mm | | | |
| --- | --- | --- | --- |
| Surface Data | | | |
| Surface No. | r | d | nd | νd |
| 1 | −57.015 | 1.70 | 1.85478 | 24.8 |
| 2 | 87.168 | 5.45 | | |
| 3 | 117.013 | 7.06 | 1.90043 | 37.4 |
| 4 | −62.441 | (variable) | | |
| 5 | 45.119 | 4.86 | 2.00069 | 25.5 |
| 6 | 151.320 | (variable) | | |
| 7 | 30.379 | 7.86 | 1.53775 | 74.7 |
| 8 | −16569.845 | 1.40 | 1.72047 | 34.7 |
| 9 | 20.608 | 7.27 | | |
| 10 (aperture stop) | ∞ | (variable) | | |
| 11 | −27.131 | 5.48 | 1.53775 | 74.7 |
| 12 | −15.613 | 1.00 | 1.62004 | 36.3 |
| 13 | −435.824 | 0.07 | | |
| 14 | 77.464 | 8.58 | 1.59522 | 67.7 |
| 15 | −35.901 | 0.15 | | |
| 16* | 181.874 | 4.79 | 1.80400 | 46.5 |
| 17* | −88.705 | (variable) | | |
| 18 | −163.432 | 8.81 | 1.95375 | 32.3 |
| 19 | −28.024 | 1.40 | 1.85478 | 24.8 |
| 20 | −80.143 | 10.95 | | |
| 21 | −32.474 | 1.40 | 1.54814 | 45.8 |
| 22 | −118.962 | 11.47 | | |
| Image Plane | ∞ | | | |

| Aspheric Data |
| --- |
| 16th Surface |

K = 0.00000e+000 A 4 = −1.81642e−006 A 6 = −1.42419e−008
A 8 = 4.16156e−011 A10 = −1.15770e−013

17th Surface

K = 0.00000e+000 A 4 = 9.43411e−007 A 6 = −1.31177e−008
A 8 = 3.85556e−011 A10 = −9.80429e−014

| Focal Length | 48.50 |
| --- | --- |
| Fno | 1.45 |
| Half Angle of View(°) | 24.04 |

-continued

| UNIT: mm | |
| --- | --- |
| Image Height | 21.64 |
| Overall Lens Length | 108.70 |
| sk | 11.47 |

| Lens Unit Interval | | |
| --- | --- | --- |
| | Infinity | Closest (−450 mm) |
| d 4 | 2.07 | 0.98 |
| d 6 | 0.95 | 2.03 |
| d10 | 11.98 | 4.73 |
| d17 | 3.99 | 11.24 |

| Lens Unit Data | | |
| --- | --- | --- |
| Lens Unit | Starting Surface | Focal Length |
| 1 | 1 | 738.19 |
| 2 | 5 | 62.80 |
| 3 | 7 | −73.53 |
| 4 | 11 | 51.43 |
| 5 | 18 | −376.44 |

Numerical Example 4

| UNIT: mm | | | | |
| --- | --- | --- | --- | --- |
| Surface Data | | | | |
| Surface No. | r | d | nd | vd |
| 1 | 1008.881 | 2.20 | 1.58313 | 59.4 |
| 2* | 37.867 | 9.77 | | |
| 3 | −33.792 | 2.26 | 1.51633 | 64.1 |
| 4 | 150.220 | 0.92 | | |
| 5 | 56.563 | 11.24 | 1.72916 | 54.7 |
| 6 | −25.521 | 1.40 | 1.85478 | 24.8 |
| 7 | −47.329 | (variable) | | |
| 8 | 69.263 | 4.62 | 1.92286 | 20.9 |
| 9 | −143.958 | 1.40 | 1.77047 | 29.7 |
| 10 | −372.741 | (variable) | | |
| 11 | 34.774 | 6.44 | 1.59522 | 67.7 |
| 12 | −159.435 | 1.20 | 1.77047 | 29.7 |
| 13 | 39.476 | 4.14 | | |
| 14 (aperture stop) | ∞ | (variable) | | |
| 15 | −20.038 | 1.20 | 1.77047 | 29.7 |
| 16 | 65.751 | 3.53 | 1.59522 | 67.7 |
| 17 | −138.789 | 0.15 | | |
| 18 | 69.921 | 9.71 | 1.59522 | 67.7 |
| 19 | −32.397 | 0.15 | | |
| 20* | 99.627 | 7.27 | 1.76450 | 49.1 |
| 21* | −39.978 | (variable) | | |
| 22 | 312.128 | 7.93 | 2.00100 | 29.1 |
| 23 | −44.888 | 1.20 | 1.73800 | 32.3 |
| 24 | 49.387 | 7.45 | | |
| 25 | −38.427 | 1.20 | 1.61340 | 44.3 |
| 26 | −100.507 | 11.50 | | |
| Image Plane | ∞ | | | |

| Aspheric Data |
| --- |
| 2nd Surface |

K = 0.00000e+000 A 4 = 3.40116e−006 A 6 = 3.03750e−010
A 8 = 2.83362e−011
20th Surface K = 0.00000e+000 A 4 = −7.25520e−006 A 6 = −5.03423e−009
A 8 = −4.06550e−012 A10 = 1.24966e−014

-continued

| UNIT: mm |
| --- |
| 21st Surface |

K = 0.00000e+000 A 4 = 4.93121e−006 A 6 = −4.25761e−009
A 8 = −7.38139e−012 A10 = 3.02796e−014

| Focal Length | 34.00 |
| --- | --- |
| Fno | 1.45 |
| Half Angle of View(°) | 32.47 |
| Image Height | 21.64 |
| Overall Lens Length | 113.49 |
| sk | 11.50 |

| Lens Unit Interval | | |
| --- | --- | --- |
| | Infinity | Closest (−280 mm) |
| d 7 | 5.00 | 3.48 |
| d10 | 1.00 | 2.52 |
| d14 | 9.61 | 4.92 |
| d21 | 1.00 | 5.69 |

| Lens Unit Data | | |
| --- | --- | --- |
| Lens Unit | Starting Surface | Focal Length |
| 1 | 1 | −424.23 |
| 2 | 8 | 61.25 |
| 3 | 11 | −536.77 |
| 4 | 15 | 32.54 |
| 5 | 22 | −63.86 |

TABLE 1

| | | Example 1 | Example 2 | Example 3 | Example 4 |
| --- | --- | --- | --- | --- | --- |
| (1) | M4/f | 0.105 | 0.172 | 0.149 | 0.138 |
| (2) | M2/f | 0.223 | 0.060 | 0.022 | 0.045 |
| (3) | f/f1 | −0.150 | −0.073 | 0.066 | −0.080 |
| (4) | f/f2 | 0.184 | 0.566 | 0.772 | 0.555 |
| (5) | f/f3 | 0.263 | −0.201 | −0.660 | −0.063 |
| (6) | f/f4 | 0.826 | 0.819 | 0.943 | 1.045 |
| (7) | f/f5 | −0.424 | −0.244 | −0.129 | −0.532 |
| (8) | b2 | −0.854 | −0.101 | 0.066 | −0.116 |
| (9) | b4 | 0.462 | 0.484 | 0.483 | 0.555 |
| (10) | T1/f | 1.180 | 0.806 | 0.293 | 0.817 |
| (11) | T2/f | 0.137 | 0.119 | 0.100 | 0.177 |
| (12) | T3/f | 0.362 | 0.144 | 0.191 | 0.225 |
| (13) | T4/f | 0.752 | 0.639 | 0.414 | 0.647 |
| (14) | T5/f | 0.616 | 0.614 | 0.465 | 0.523 |
| (15) | sk/f | 0.522 | 0.401 | 0.236 | 0.338 |
| (16) | TD/f | 3.852 | 2.938 | 2.005 | 3.000 |
| (17) | f/f11 | −0.536 | −0.351 | −1.209 | −0.504 |
| (18) | (r2b + r2a)/(r2b − r2a) | 1.624 | 0.946 | 1.850 | 0.687 |

Image Pickup Apparatus

Figure 13:
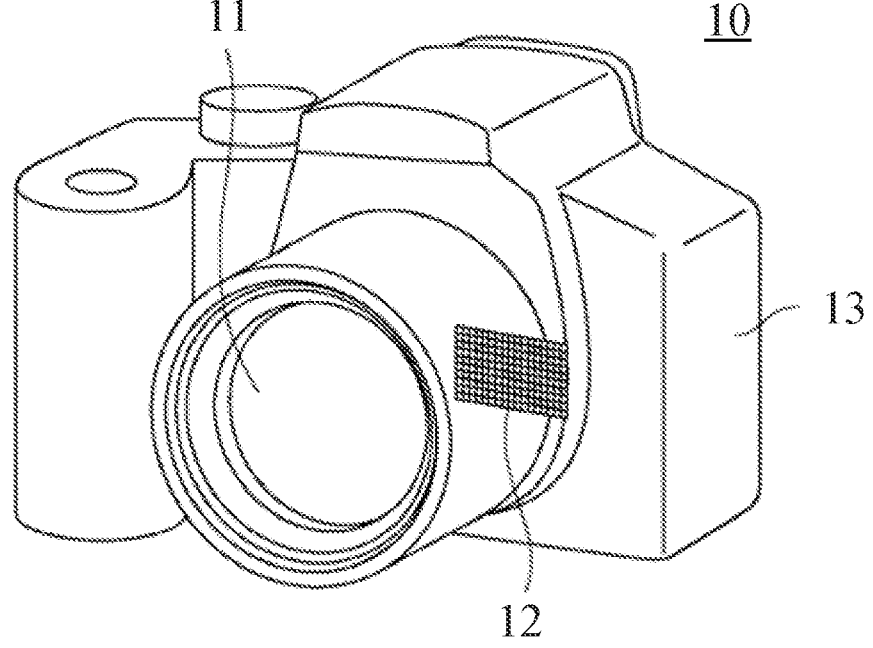
FIG. 13 illustrates an image pickup apparatus including the optical system according to any one of Examples 1 to 4.

FIG. 13 illustrates a digital still camera (image pickup apparatus) using the optical system according to Examples 1 to 4 as an imaging optical system. Reference numeral 10 denotes a camera body, and reference numeral 11 denotes the imaging optical system according to any one of the optical systems according to Examples 1 to 4. Reference numeral 12 denotes a solid-state image sensor (photoelectric conversion element) such as a CCD sensor or CMOS sensor, which is built in the camera body 10 and captures (photo-electrically converts) an optical image formed by the imaging optical system 11. The camera body 10 may be a single-lens reflex camera with a quick turn mirror, or a mirrorless camera having no quick turn mirror.

Applying the optical system according to Examples 1 to 4 to an image pickup apparatus such as a digital still camera can provide the image pickup apparatus that has a small size, high optical performance, a wide angle of view, and a large aperture ratio, and can achieve high-speed AF.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-024113, filed on Feb. 18, 2022, which is hereby incorporated by reference herein in its entirety.

What is claimed is:

1. An optical system including a plurality of lens units, the plurality of lens units consisting of, in order from an object side to an image side:

a first lens unit, a second lens unit having positive refractive power and consisting of one lens component, a third lens unit including at least one positive lens and one negative lens, a fourth lens unit having positive refractive power and including at least two positive lenses and one negative lens, and a fifth lens unit, wherein during focusing, the first lens unit, the third lens unit, and the fifth lens unit are fixed, and the second lens unit and the fourth lens unit move.

2. The optical system according to claim 1, wherein the following inequality is satisfied:

$$0.05 \leq M4/f \leq 0.40$$

where M4 is an absolute value of a moving amount of the fourth lens unit during focusing from an infinity object to a closest object, and f is a focal length of the optical system in an in-focus state on the infinity object.

3. The optical system according to claim 1, wherein the following inequality is satisfied:

$$0.01 \leq M2/f \leq 0.45$$

where M2 is an absolute value of a moving amount of the second lens unit during focusing from an infinity object to a closest object, and f is a focal length of the optical system in an in-focus state on the infinity object.

4. The optical system according to claim 1, wherein the following inequality is satisfied:

$$-0.3 \leq f/f1 \leq 0.2$$

where f1 is a focal length of the first lens unit, and f is a focal length of the optical system in an in-focus state on an infinity object.

5. The optical system according to claim 1, wherein the following inequality is satisfied:

$$0.05 \leq f/f2 \leq 1.10$$

where f2 is a focal length of the second lens unit, and f is a focal length of the optical system in an in-focus state on an infinity object.

6. The optical system according to claim 1, wherein the following inequality is satisfied:

$$-1.0 \leq f/f3 \leq 0.5$$

where f3 is a focal length of the third lens unit, and f is a focal length of the optical system in an in-focus state on an infinity object.

7. The optical system according to claim 1, wherein the following inequality is satisfied:

$$0.5 \leq f/f4 \leq 1.5$$

where f4 is a focal length of the fourth lens unit, and f is a focal length of the optical system in an in-focus state on an infinity object.

8. The optical system according to claim 1, wherein the following inequality is satisfied:

$$-1.00 \leq f/f5 \leq -0.01$$

where f5 is a focal length of the fifth lens unit, and f is a focal length of the optical system in an in-focus state on an infinity object.

9. The optical system according to claim 1, wherein the following inequality is satisfied:

$$-0.99 \leq b2 \leq 0.20$$

where b2 is a lateral magnification of the second lens unit in an in-focus state on an infinity object.

10. The optical system according to claim 1, wherein the following inequality is satisfied:

$$0.3 \leq b4 \leq 0.8$$

where b4 is a lateral magnification of the fourth lens unit in an in-focus state on an infinity object.

11. The optical system according to claim 1, wherein the following inequality is satisfied:

$$0.1 \leq T1/f \leq 1.5$$

where T1 is a distance on an optical axis from a lens surface closest to an object of the first lens unit to a lens surface closest to an image plane of the first lens unit, and f is a focal length of the optical system in an in-focus state on an infinity object.

12. The optical system according to claim 1, wherein the following inequality is satisfied:

$$0.01 \leq T2/f \leq 0.40$$

where T2 is a distance on an optical axis from a lens surface closest to an object of the second lens unit to a lens surface closest to an image plane of the second lens unit, and f is a focal length of the optical system in an in-focus state on an infinity object.

13. The optical system according to claim 1, wherein the following inequality is satisfied:

$$0.01 \leq T3/f \leq 0.50$$

where T3 is a distance on an optical axis from a lens surface closest to an object of the third lens unit to a lens surface closest to an image plane of the third lens unit, and f is a focal length of the optical system in an in-focus state on an infinity object.

14. The optical system according to claim 1, wherein the following inequality is satisfied:

$$0.1 \leq T4/f \leq 1.0$$

where T4 is a distance on an optical axis from a lens surface closest to an object of the fourth lens unit to a lens surface closest to an image plane of the fourth lens unit, and f is a focal length of the optical system in an in-focus state on an infinity object.

15. The optical system according to claim 1, wherein the following inequality is satisfied:

$$0.15 \leq T5/f \leq 0.90$$

where T5 is a distance on an optical axis from a lens surface closest to an object of the fifth lens unit to a lens surface closest to an image plane of the fifth lens unit, and f is a focal length of the optical system in an in-focus state on an infinity object.

16. The optical system according to claim 1, wherein the following inequality is satisfied:

$$0.05 \leq sk/f \leq 1.00$$

where sk is a distance on an optical axis from a lens surface closest to an image plane of the optical system to an image plane, and f is a focal length of the optical system in an in-focus state on an infinity object.

17. The optical system according to claim 1, wherein the following inequality is satisfied:

$$1 \leq TD/f \leq 6$$

where TD is a distance on an optical axis from a lens surface closest to an object of the optical system to an image plane, and f is a focal length of the optical system in an in-focus state on an infinity object.

18. The optical system according to claim 1, wherein the following inequality is satisfied:

$$-2.0 \leq f/f11 \leq -0.1$$

where f11 is a focal length of a lens closest to an object of the optical system, and f is a focal length of the optical system in an in-focus state on an infinity object.

19. The optical system according to claim 1, wherein the following inequality is satisfied:

$$0.2 \leq (r2b+r2a)/(r2b-r2a) \leq 4.0$$

where r2a is a radius of curvature of a lens surface of the second lens unit closest to an object, r2b is a radius of curvature of a lens surface of the second lens unit closest to an image plane, and f is a focal length of the optical system in an in-focus state on an infinity object.

20. The optical system according to claim 1, wherein the fifth lens unit includes at least one positive lens and two negative lenses.

21. The optical system according to claim 1, wherein the fourth lens unit includes, in order from the object side to the image side, a cemented lens, a biconvex positive lens, and a positive lens.

22. The optical system according to claim 1, further comprising an aperture stop provided in the third lens unit.

23. The optical system according to claim 1, wherein the third lens unit includes lenses consists of, in order from the object side to the image side, a positive lens and a negative lens.

24. An image pickup apparatus comprising:

an optical system; and an image sensor configured to capture an image formed by the optical system, wherein the optical system includes a plurality of lens units, the plurality of lens units consisting of, in order from an object side to an image side:

a first lens unit, a second lens unit having positive refractive power and consisting of one lens component, a third lens unit including at least one positive lens and one negative lens, a fourth lens unit having positive refractive power and including at least two positive lenses and one negative lens, and a fifth lens unit, wherein during focusing, the first lens unit, the third lens unit, and the fifth lens unit are fixed, the second lens unit and the fourth lens unit move.

* * * * *